(12) United States Patent
Romagnoli et al.

(10) Patent No.: US 8,538,883 B2
(45) Date of Patent: Sep. 17, 2013

(54) METHOD AND SYSTEM FOR DIGITAL DOCUMENT MANAGEMENT ON A MOBILE DEVICE

(71) Applicant: Barclays Bank PLC, London (GB)

(72) Inventors: Amy Sobocinski Romagnoli, Bear, DE (US); Mike Starck, Newton Square, PA (US); Thomas P. Akana, Avondale, PA (US); Loren Barton, London (GB); Patrick Mesa, Boothwyn, PA (US); Leslie Moore, Wilmington, DE (US)

(73) Assignee: Barclays Bank PLC, London (GB)

( * ) Notice: Subject to any disclaimer, the term of this patent is extended or adjusted under 35 U.S.C. 154(b) by 0 days.

(21) Appl. No.: 13/644,690

(22) Filed: Oct. 4, 2012

(65) Prior Publication Data

US 2013/0060699 A1    Mar. 7, 2013

Related U.S. Application Data

(63) Continuation of application No. 12/955,326, filed on Nov. 29, 2010, now Pat. No. 8,306,916.

(51) Int. Cl.
*G06Q 40/00*  (2012.01)

(52) U.S. Cl.
USPC ............ 705/44; 705/13; 705/35; 705/39; 705/43; 455/406; 713/176

(58) Field of Classification Search
USPC ............ 705/35, 13, 9, 43–44, 39; 455/406; 713/176
See application file for complete search history.

(56) References Cited

U.S. PATENT DOCUMENTS

| | | | |
|---|---|---|---|
| 2006/0256083 | A1 | 11/2006 | Rosenberg |
| 2007/0073659 | A1 | 3/2007 | Lee et al. |
| 2010/0121736 | A1 | 5/2010 | Kalke |
| 2010/0125508 | A1 | 5/2010 | Smith |

FOREIGN PATENT DOCUMENTS

EP    1224597 A1  *  7/2002

\* cited by examiner

*Primary Examiner* — Harish T Dass
(74) *Attorney, Agent, or Firm* — Welsh Flaxman & Gitler LLC (57) ABSTRACT

A method and system are described for tracking a process of provisioning, by a middleware server to a portable device in a mobile payment system, electronic wallet data for authorizing a payment transaction. In an embodiment, a user request for a payment account product is transmitted by the portable device to the middleware server. In response, the middleware server initiates a provisioning process for the requested payment account product, including storing status data indicative of an initiated state of the provisioning process. The middleware server then transmits a digital document to the portable device, including information that must be viewed by the user, and updates the status data indicative of a transmitted state of the digital document. In response to receiving an indication that the digital document has been viewed, the middleware server updates the stored status data indicative of a digital document viewed state. The middleware then provisions an electronic wallet data for the requested payment account product to the portable device.

13 Claims, 5 Drawing Sheets

METHOD AND SYSTEM FOR DIGITAL DOCUMENT MANAGEMENT ON A MOBILE DEVICE

CROSS REFERENCE TO RELATED APPLICATION

This U.S. Patent Application is a continuation of U.S. patent application Ser. No. 12/955,326, filed Nov. 29, 2010, entitled "METHOD AND SYSTEM FOR DIGITAL DOCUMENT MANAGEMENT ON A MOBILE DEVICE", which is currently pending.

FIELD OF THE INVENTION

This invention relates to a mobile payment account system. More particularly, the invention relates to an improved process of provisioning of a mobile payment account on a mobile device and management of associated digital documents.

BACKGROUND OF THE INVENTION

Mobile payment account systems are generally known, in which portable electronic devices are configured to provide payment from an electronic wallet. Typically, these portable electronic devices are configured to enable a contactless communication with a merchant Point Of Sale (POS) terminal to carry out a payment transaction, for example, using near field communication (NFC) technology. As described in the commonly owned co-pending U.S. patent application Ser. No. 12/891,866, entitled "METHOD AND SYSTEM FOR ELECTRONIC WALLET ACCESS", filed Oct. 15, 2010, and U.S. patent application Ser. No. 12/905,419, entitled "MOBILE PAYMENT SYSTEM", filed Sep. 28, 2010, both of which are incorporated herein by reference in their entirety, activated mobile payment account data can be stored in the secure memory of the portable electronic device which can then be used to carry out transactions with the merchant electronic POS terminal via a NFC link. Systems described in the above-referenced commonly owned applications advantageously provide the customer with the ability to apply for a payment product that, once approved, is immediately provisioned and activated on the mobile device, thus allowing the customer to immediately make purchases using the activated mobile payment account. As described in US'866, provisioning of a mobile payment account, for example in response to an instant provisioning request from the mobile device, involves creation and communication of data for the mobile payment account to the mobile device. Activation of the mobile payment account provisioned on the mobile device typically involves authentication of the user before the mobile payment account is enabled for use in the mobile payment system.

Generally, issuing banks have issued paper terms and conditions (T&C) and cardmember agreements (CMA) to support traditional credit card programs. In the case of an instant credit offer, (e.g. retail) the customer is presented the CMA in paper faun as part of the paper application. In a non-instant credit offer (e.g. mail channels), the CMA is delivered to the customer in paper format, via US Mail as part of their new cardmember fulfillment kit. In a web apply channel, the disclosure is generally provided digitally, allowing the customer to simply print out the disclosure, and a follow up hard copy is delivered by post in the fulfillment kit. The systems described in the above-referenced co-pending '866 and '419 applications present an unusual problem in that "instant credit" for a mobile user assumes not only traditional instant credit (such as the retail scenario above), but that it provides the customer with the ability to immediately provision and activate the mobile payment account on the mobile device, thus providing the customer with the ability to immediately begin making purchases. This mobile instant credit availability requires the issuer to consider a new, digital disclosure solution.

SUMMARY OF THE INVENTION

In one aspect of the present invention, a computer-implemented method is provided for tracking a process of provisioning, by a middleware server to a portable device in a mobile payment system, electronic wallet data for authorizing a payment transaction. The method comprises transmitting, by the portable device to the middleware server, a user request for a payment account product; initiating, by the middleware server responsive to the received user request, a provisioning process for the requested payment account product, including storing status data indicative of an initiated state of the provisioning process; transmitting, by the middleware server to the portable device, a digital document including information that must be viewed by the user and updating the stored status data indicative of a digital document transmitted state (that is, the transmitted state of the digital document); receiving, by the middleware server from the portable device, an indication that the digital document has been viewed by the user, and in response updating the stored status data indicative of a digital document viewed state; and provisioning, by the middleware server to the portable device, electronic wallet data for the requested payment account product.

Generally, the digital document is a terms and conditions (T&C) digital document or a cardmember agreement (CMA). In a further aspect, the T&C digital document is delivered to the portable device as a pre-application disclosure and the CMA is delivered to the portable device as a post-application disclosure.

In another aspect, the process of delivering the CMA is integrated within the payment product activation process which occurs on the handset. Once the customer has been given the option to view their CMA and elects to continue the account activation process, the payment account can then be fully activated and made available for immediate use.

In another aspect of the present invention, a mobile payment account system is provided, comprising a portable device in communication with a middleware server, wherein the portable device transmits, to the middleware server, a user request for a payment account product; and wherein the middleware server: initiates, responsive to the received user request, a provisioning process for the requested payment account product, including storing status data indicative of an initiated state of the provisioning process; transmits, to the portable device, a digital document including information that must be viewed by the user and updates the stored status data indicative of a digital document transmitted state; receives, from the portable device, an indication that the digital document has been viewed by the user, and in response, updates the stored status data indicative of a digital document viewed state; and provisions, to the portable device, electronic wallet data for the requested payment account product.

In yet a further aspect there is provided a portable device in the above system and a computer program arranged to carry out the above method when executed by components of a mobile payment system.

BRIEF DESCRIPTION OF THE DRAWINGS

There now follows, by way of example only, a detailed description of embodiments of the present invention, with references to the figures identified below.

FIG. 4, which comprises FIGS. 4a to 4f, illustrates a sequence of screens displayed by the mobile device to the user during the process of applying for a new mobile payment account product.

DETAILED DESCRIPTION OF EMBODIMENTS OF THE INVENTION

Figure 1:
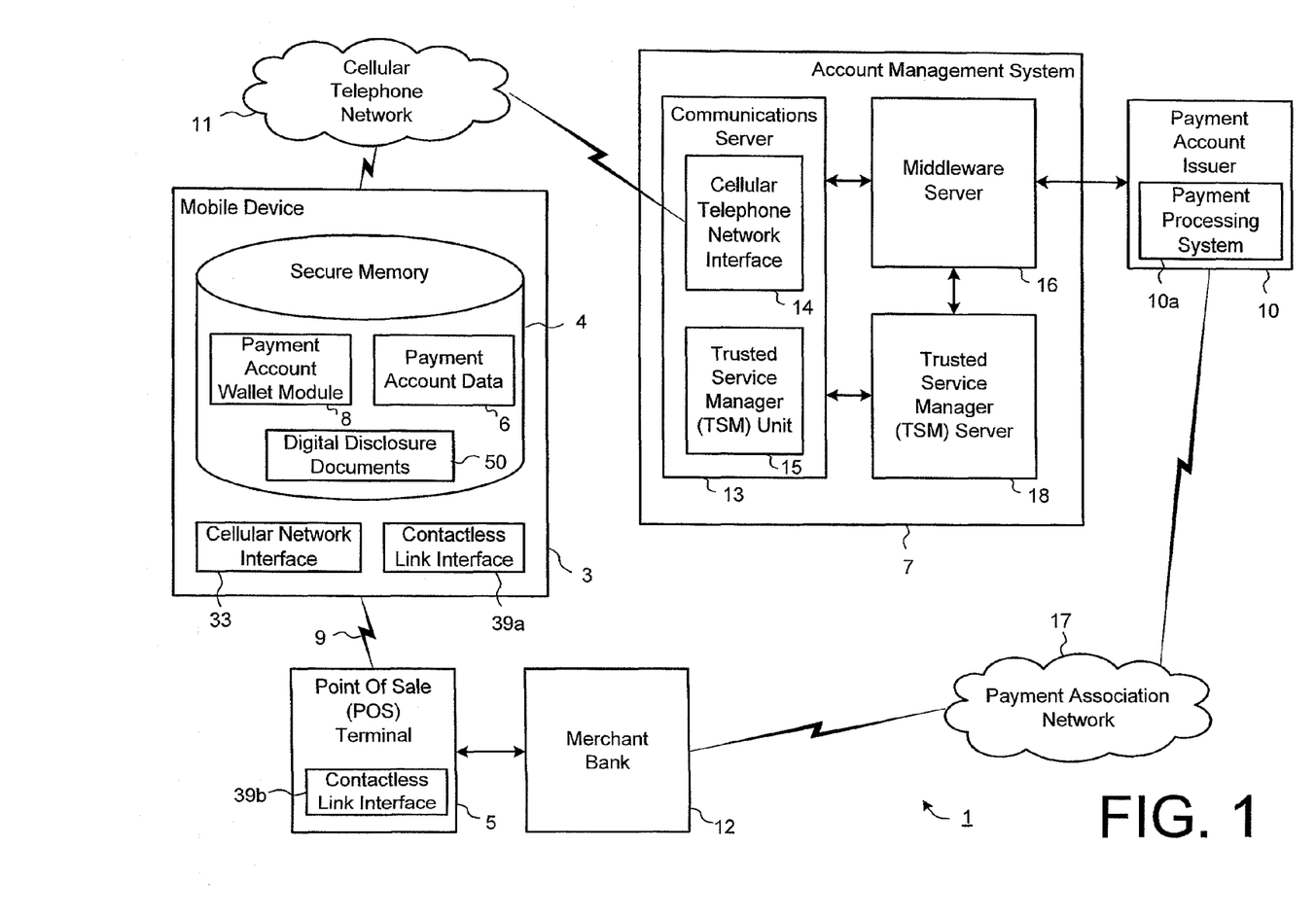
FIG. 1 is a block diagram showing the main components of a mobile payment system according to an embodiment of the invention.

Referring to FIG. 1, a mobile payment system 1 according to an embodiment comprises a mobile device 3, a merchant's electronic Point of Sale (POS) terminal 5 as commonly known in the field, and an account management system 7 associated with a payment account issuer 10. The mobile device 3, merchant's electronic POS terminal 5, and the account management system 7 associated with the payment account issuer 10 communicate electronically with one another. The account management system 7 provides for mobile payment account creation and activation, transaction authorization, and other related functionalities, as described in the above-referenced co-pending U.S. patent application Ser. Nos. 12/891,866 and 12/905,419. As will be described below, the account management system 7 can include a communications server 13 and a Trusted Service Manager (TSM) server 18 for facilitating communication between the middleware server 16 and the mobile device 3. The payment account issuer 10 can include a payment processing (authorization and fraud monitoring) system 10a for authorizing and effecting payment transactions from payment accounts associated with the payment account issuer 10, in response to payment transaction instructions received via a payment association network 17. In this embodiment, the mobile device 3 and the electronic POS terminal 5 communicate with one another over a contactless communication link 9 via respective contactless communication interfaces 39a, 39b. It is appreciated that this contactless communication link 9 may be a near field communication (NFC) link, an infra-red link, an ultra-sonic link, an optical link, a radio frequency (eg. RFID) link, a wireless link such as Bluetooth or Wi-Fi based on the IEEE 802.11 standards, or any other communication link that does not require direct physical contact. The mobile device 3 can communicate with the account management system 7 over a cellular telephone network 11 via a cellular network interface 33.

As shown in FIG. 1, the mobile device 3 in this embodiment includes a secure memory 4 storing payment account data (that is, electronic wallet data) 6 for one or more mobile payment accounts that have been set up on the mobile device 3. The secure memory 4 can be a Universal Integrated Circuit Card (UICC) secure element, any other secure memory configuration, such as an embedded secure element chip, or as part of a peripheral accessory device to the mobile device 3, such as a micro Secure Digital card—otherwise known as a micro SD card, as are known in the art. Other forms of mobile handset software and/or hardware can be implemented to provide built-in secure electronic wallet functionality for accessing the secure memory 4, including encryption and decryption of the payment account data 6, as necessary. The mobile device 3 is configured with built-in functionality providing access to secure memory on the Subscriber Identity Module (SIM) card in the mobile device 3. In the present embodiment, payment account data 6 for a mobile payment account that is securely stored in the mobile device 3 includes data identifying a user's account at a payment account issuer 10 from which funds can be transferred to the merchant bank to complete a transaction, via a payment association network 17. The payment account data 6 can additionally include data defining an amount of pre-paid funds that have been transferred from the user's payment account issuer 10 to that mobile payment account. In this way, the electronic wallet can include a payment account linked to multiple funding sources, such as a pre-paid account, deposit account and/or credit account. As an alternative, the electronic wallet can include a plurality of mobile payment accounts, each linked to a respective funding source.

As will be described below, a user associated with the mobile device 3 can search and apply for new mobile payment account products that are available for the user. In this embodiment, the mobile payment system 1 is configured to enable the user to apply for a new mobile payment account product directly from the mobile device 3, including provisioning and activation of the requested mobile payment account once approved by the account management system and/or payment account issuer, as well as providing, monitoring and receiving acceptance of digital disclosure documentation during the application process. In this way, a user is able to efficiently apply for a new mobile payment account product solely through the mobile device 3, and the account management system 7 is able to advantageously track the application process of the user. For example, the application process of the user may be tracked from the initial user selection of a menu option to browse for eligible products, through the user viewing and accepting specific and crucial terms, conditions and agreement clauses set out in digital disclosure documents particular to a product, and finally through approval and activation of a mobile payment account product on the user's mobile device 3.

The mobile device 3 also includes a payment account wallet application module 8 storing processing instructions (in accordance with a preferred embodiment of the present invention processing instructions are computer-implementable instructions) used to control the operation of the mobile device 3, to facilitate the application for and management of one or more mobile payment accounts on the mobile device 3 and to handle the process of conducting a transaction with a merchant via the electronic POS terminal 5. The transaction with a merchant via the electronic POS terminal is facilitated using a mobile payment account on the mobile device 3 to effectively transfer funds from the mobile payment account on the mobile device 3, or an associated payment account issuer 10, to the merchant. It is appreciated that the payment account wallet application module 8 can be implemented as one or more software components of an operating system running on the mobile device 3 or implemented as one or more separate software applications installed on the mobile device 3. Such software applications can be configured to run as background applications on the mobile device 3 that monitor receipt of messages or events and activate upon receipt of appropriate messages or events so as to carry out the above operations. The software applications can alternatively be launched by the user. Alternatively, the payment account wallet application module 8 is stored in the secure memory 4, and is loaded into a virtual machine of the mobile device 3 to provide the functionality of the present embodiment.

A secure mobile payment account provisioning and activation process can be carried out between the mobile device 3 and the account management system 7, as described in the above referenced co-pending U.S. patent application Ser. No. 12/891,866. The activated mobile payment account data stored in the secure memory 4 of the mobile device 3 can then be used to carry out transactions with a merchant electronic POS terminal 5 via the contactless communication link 9, whereby a requested amount of funds can be transferred from the mobile payment account stored in the mobile device 3 to the merchant's bank 12. Techniques and protocols for implementing the authorization and transfer of funds between the merchant POS terminal 5, the merchant bank 12, and the payment account issuer 10 via the payment association network 17 are well known to those skilled in the art and are therefore not described further herein.

The account management system 7 in the mobile payment system 1 will now be described in more detail with reference to FIG. 1, which shows the elements of the account management system 7 used in embodiments of the present invention. The account management system 7 includes a communications server 13, a middleware server 16, and a TSM server 18, which communicate electronically with one another. In this embodiment, the communications server 13, middleware server 16, and TSM server 18 communicate with one another via secure network links over a private Local Area Network (LAN), a Virtual Private Network (VPN) connection, or other dedicated secure connection. It is appreciated that, although the components of the account management system 7 in this embodiment are provided as separate servers, one or more of the servers could be provided as software and/or hardware modules in the same server.

As shown in FIG. 1, the data is communicated between the mobile device 3 and the middleware server 16 over the cellular telephone network 11 via a cellular telephone network interface 14 of the communications server 13. The TSM server 18 performs logical data preparation of the data to be communicated to the mobile device by forming appropriate commands to be written to the secure memory 4 of the mobile device 3. It is appreciated that the precise form of the data depends on the particular implementation of the secure memory 4 of the mobile device 3 and/or the payment association scheme program for facilitating payment. The TSM server 18 can also perform encryption of the data, for example, of the sensitive payment account information, for example, payment keys, in the mobile payment account data 6. The TSM server 18 then passes the encrypted data to the mobile device 3 via the communications server 13 and the cellular telephone network 11.

The communications server 13 can also include a separate TSM unit 15 for securely routing the data to the mobile device 3. In the above example, the TSM unit 15 in the communications server 13 would not access any of the sensitive portions of the encrypted data that are routed to the mobile device 3 via the cellular telephone network interface 14.

Figure 2:
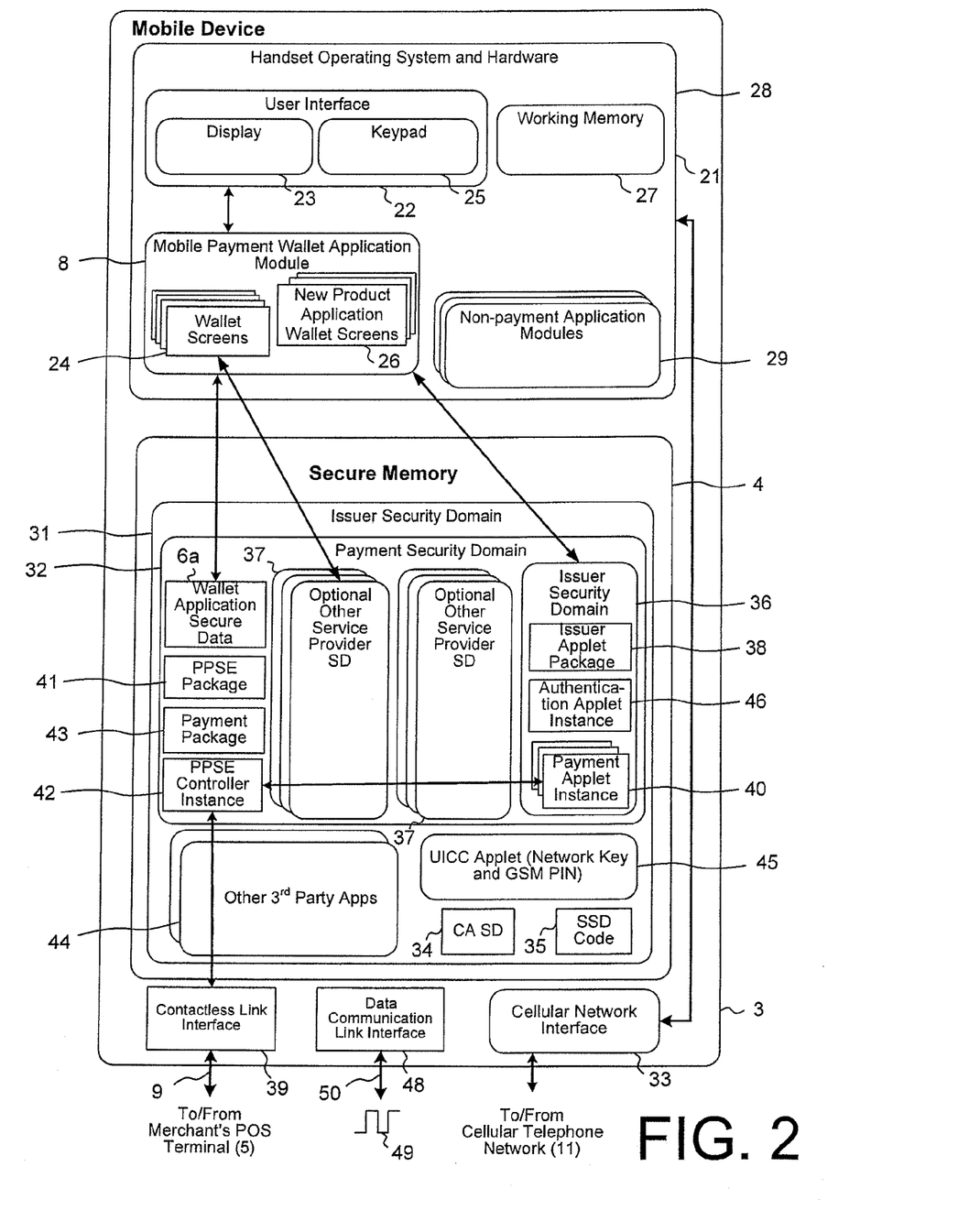
FIG. 2 is a block diagram showing the main hardware and/or software elements of a mobile device shown in FIG. 1 according to an embodiment.
Figure 3:
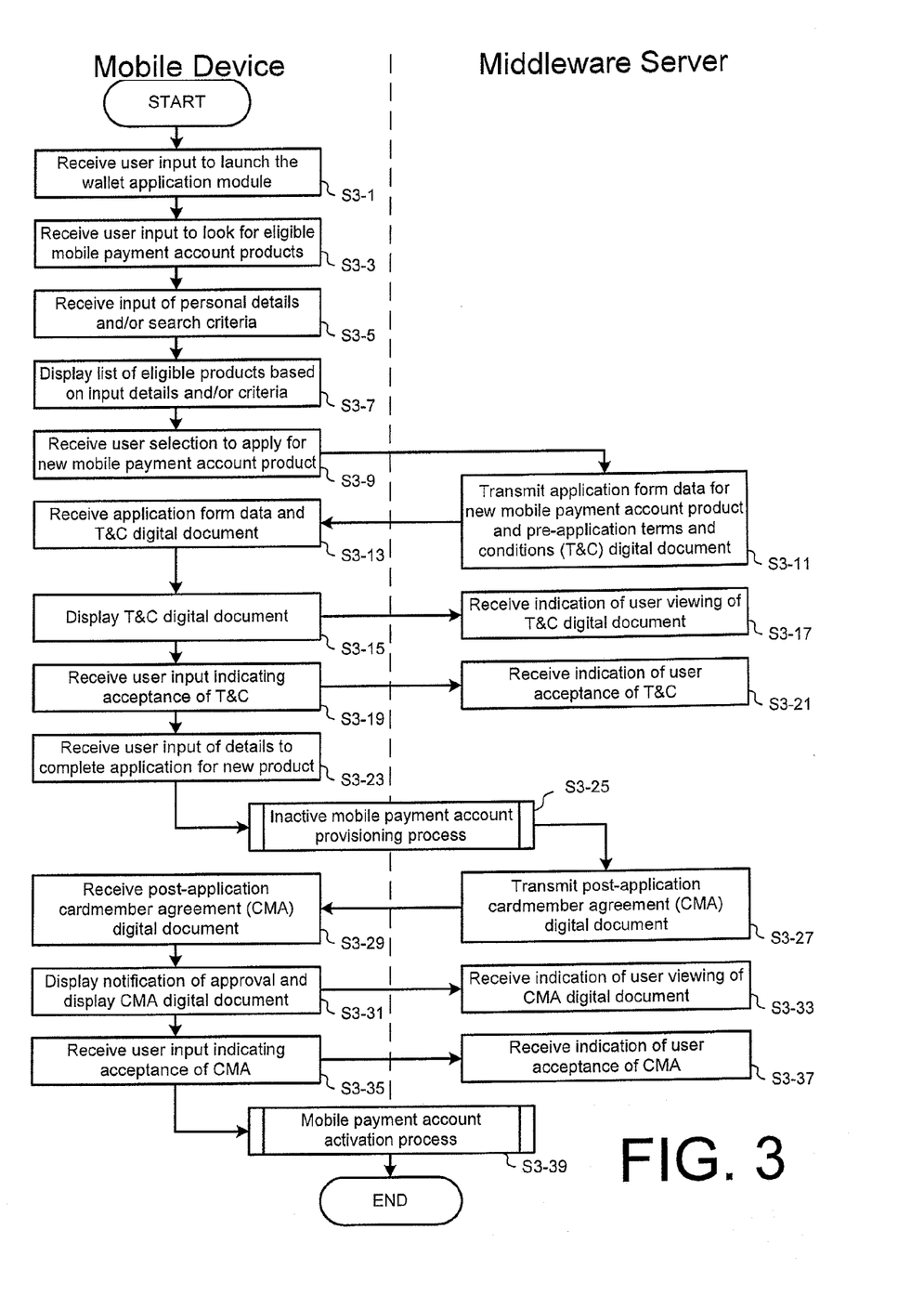
FIG. 3 is a flow diagram illustrating the main processing steps performed by the mobile device of FIGS. 1 and 2 in a process for applying for a new mobile payment account product according to an embodiment.

FIG. 2 shows the elements of a mobile device 3 according to an embodiment of the present invention. In this embodiment, the mobile device 3 is a mobile handset. As shown in FIG. 2, the mobile handset operating system and hardware includes a user interface 22 arranged to process inputs from a keypad 23 and to control output on a display 25. The keypad 23 and display 25 may be provided as separate hardware entities of the mobile device 3, or alternatively, is provided as an integrated entity such as a touch sensitive display screen user interface. The mobile device 3 can also include components included in commonly known mobile handsets, such as a microphone, an earpiece speaker, a camera and a controller, and/or a GPS receiver etc., which are not shown. A working memory 27 is provided for use by the handset operating system and hardware units 21.

Software and data can be transferred via the cellular network interface 33 or via a different data communication link interface 48 in the form of signals 49, which may be electronic, electromagnetic, optical, or other signals capable of being received by the data communication link interface 48 via a communication path 50 that carries the signals 49 and may be implemented using wire or cable, fiber optics, a physical phone line, a wireless link, a radio frequency link, or any other suitable communication channel, including any combination of suitable communication channels. It is appreciated that the communication path 50 can be linked or merged with the communication path from the cellular network interface 33 to the cellular telephone network 11.

As mentioned above, the mobile device 3 includes a secure memory 4. The mobile device 3 is operable to receive the payment account data 6 and activation request messages from and send validation messages to the account management system 7 via the cellular telephone network interface 33 and the cellular telephone network 11. The mobile device 3 is also operable to store the received payment account data 6 in the secure memory 4. The mobile device 3 is also operable to receive transaction authorization request messages from and send authorization messages to the merchant's POS terminal 5 via the contactless communications link interface 39 and the contactless communication link 9. It is appreciated that communication between a POS terminal 5 and the mobile device 3 can involve transmission of data in a single direction from the mobile device 3 to the POS terminal 5, depending on an implemented protocol (such as the well known protocol used by the Discover Zip™ cashless payment system).

The mobile device 3 also includes a payment account wallet application module 8 as mentioned above, which stores processing instructions used to control the operation of the mobile device 3 to perform various mobile payment account processes. The payment account wallet application module 8 can include an account creation sub-module and an account activation sub-module. The account creation sub-module and the account activation sub-module store processing instructions to create a request for a new mobile payment account if desired and to carry out a secured account validation and activation processes in response to user input from the keypad 23 as described in the above-referenced co-pending U.S. patent application Ser. No. 12/891,866. The payment account wallet application module 8 can also include a transaction authorization sub-module which stores processing instructions used to control the operation of the mobile device 3 to carry out and authorize a transaction in response to user input from the user interface 22, for example as described in the above-referenced co-pending U.S. patent application Ser. No. 12/905,419. The mobile payment account wallet application module 8 can be configured to store a plurality of wallet screens 24 which may be output on the display 25 of the user interface 22 to facilitate user interaction with the sub-modules of the mobile payment account wallet application module 8. One wallet screen can be a main menu displaying a list of user selectable options for example to access and manage payment account data 6 of a selected mobile payment account stored on the mobile device 3. In this embodiment, a plurality of "new product application process" wallet screens 26 are provided in the wallet application module 8 which can be displayed in response to user selection of an option to view and apply for new mobile payment account products, as will be described in more detail below. The mobile device 3 can also store one or more non-payment application modules 29 including processing instructions used to control the operation of the mobile device 3 to perform other non-payment related processes.

Also schematically illustrated in the exemplary embodiment of FIG. 2 are security domains which can be implemented in the secure memory 4 of the mobile device 3. The secure memory 4 is advantageously implemented to be compliant with one or more specifications of a standard infrastructure in order to facilitate communication of data and messages between the mobile device 3 (and the secure memory 4) and other entities in the mobile payment system 1. For example, in this embodiment, the secure memory 4 is compliant with the GlobalPlatform Card Specifications (available at), and accordingly includes a plurality of security domains for facilitating control of the management of and accessibility to functionality and sensitive data associated with specific areas of the secure memory 4 by the various entities in the mobile payment system 1. The GlobalPlatform Card Specifications (for example the "GlobalPlatform Card Specification 2.2", March 2006, available at GPCardSpec_v2.2.pdf) define a hierarchical arrangement of security domains, each defining functionality and data that can be accessed by a respective associated entity, for example cryptographic keys or certificates that can be used to support secure channel protocol operations between the mobile device 3 and the entity or entities associated with that particular security domain, and/or to authorize secure memory 4 content management functions.

Accordingly, As shown in the exemplary embodiment of FIG. 2, a main issuer security domain 31, associated with the account management system 7 and/or the mobile payment account issuer 10, may include a payment security domain 32 associated with the payment account issuer 10, a Controlling Authority (CA) security domain 34 associated with a controlling authority in the mobile payment system 1, and a Supplementary Security Domain (SSD) code 35 associated with an intermediate security domain (not shown) to manage card content and perform cryptographic services for confidentiality. The payment security domain 32 in this exemplary embodiment includes wallet application secure data 6a, which includes the payment account data 6 and other data for use by the mobile payment account wallet application module 8. The payment security domain 32 can also include an issuer security sub-domain 36 and one or more optional other service provider security domains 37. The issuer security domain 36 can include an issuer applet package 38, an authentication applet instance 46, and one or more payment applet instances 40 which enable the transaction processing functionality using an activated mobile payment account. The payment security domain 32 may also include a Proximity Payment System Environment (PPSE) package 41 and a PPSE controller instance 42 for facilitating an additional application layer level of control of the transaction processing functionality between the one or more payment applet instances 40 and the contactless communications link interface 39, and a payment package 43. In particular, the PPSE package 41 and controller instance 42 may be advantageously provided where the mobile device 3 stores a plurality of mobile payment accounts, and operate to communicate with the NFC reader of the merchant POS terminal 5 to control which one of the payment applet instances 40, associated with a respective mobile payment account stored on the mobile device 3, is to respond back to the POS reader.

It is appreciated that each security domain will be associated with one or more respective entities in the mobile payment system 1 depending on the particular business model that is implemented by the system. The specific implementation details of the various security domains for compliance with, for example, the GlobalPlatform Card Specifications are outside the scope of this application and will be apparent to the skilled reader. The mobile device 3 can also include one or more other third party application modules 44 stored in the secure memory 4, for example an application module related to a third party loyalty scheme. The secure memory 4 can also store a UICC applet 45 which is an application to manage and hold the mobile network operator's functionality and secure information, such as a network key and GSM (Global Systems for Mobile Communications) PIN (Personal Identification Number).

A brief description has been given above of the components forming part of the mobile payment system 1 of this embodiment. A more detailed description of the operation of these components in this embodiment will now be given with reference to the flow diagram of FIG. 3, which comprises FIGS. 3a to 3d. FIGS. 3a to 3d provide an example computer-implemented process for applying for and provisioning a mobile payment account using the mobile device 3 in communication with the account management system 7. Reference is also made to FIG. 4, which comprises FIGS. 4a to 4g, schematically illustrating exemplary display screens that can be presented to a user on the mobile device 3 in the application process.

Figure 4A:
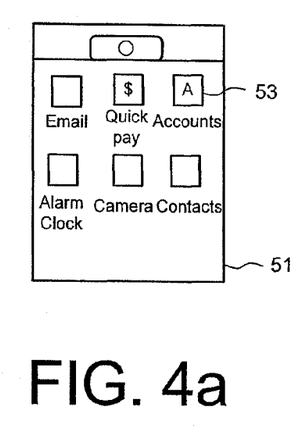
Figure 4B:
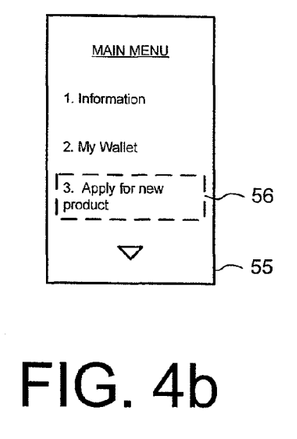
Figure 4C:
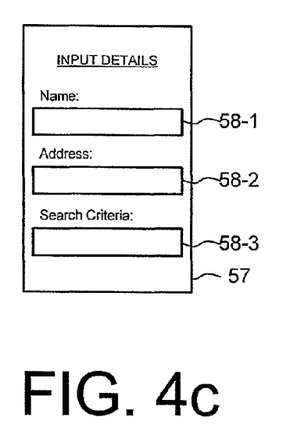
Figure 4D:
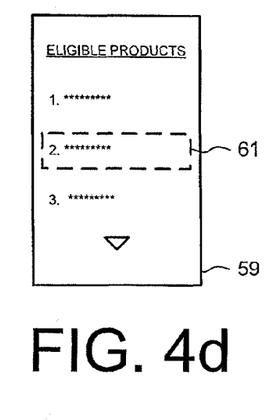

As shown in FIG. 3a, the process begins at step S3-1 where the mobile device 3 receives user input to launch the mobile payment account wallet application module 8. FIG. 4a shows an example user interface 51 of the user's mobile device 3 for enabling the user to launch the mobile payment account wallet application module 8 by selection of a respective application icon 53 displayed by the handset operating system 28. Many other forms of user interface are possible depending on the particular mobile device used to implement the present embodiment. After the user has launched the wallet application module 8, the mobile device 3 receives, at step S3-3, user selection of a menu option to search for eligible mobile payment account payment products and/or to apply for a new mobile payment account product. In the example shown in FIG. 4b, a "main menu" wallet screen 55 is displayed by the mobile device 3 to the user, providing a plurality of user selectable options for the electronic wallet. The user scrolls through the list of displayed options to highlight 56 and select a desired menu option. In response to selection of the option to apply for a new product, the mobile device 3 displays a user details input wallet screen 57 as shown in FIG. 4c to prompt for user input of personal details, such as the user's name and address, into respective input fields 58. Alternatively or additionally, predetermined personal details are stored in the payment account data 6 in the secure memory 4 and are automatically input to the respective fields. Other user related information and/or search criteria can be obtained at this step for use in determining a list of eligible products for the user. Accordingly, at step S3-5 the mobile device 3 receives input of personal details and/or product search criteria and displays, at step S3-7, a list of eligible products based on the input details and/or search criteria. The list of eligible products is determined by the mobile device 3, based on stored data identifying all available mobile payment products and associated prerequisites and eligibility criteria. Alternatively, the determination is carried out by the account management system 7 based on the input details and/or search criteria received from the mobile device 3. FIG. 4d shows an exemplary wallet screen 59 displaying a list of user selectable eligible products.

Figure 4E:
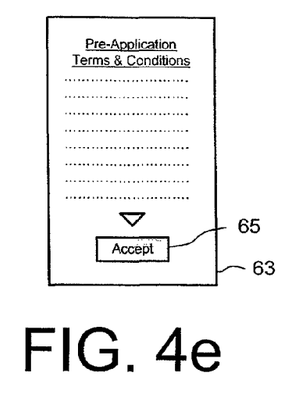

At step S3-9, the mobile device 3 receives user input of a selected 61 one of the eligible mobile payment account products and in response, transmits data identifying the selected product to the account management system 7 to initiate an application process for that product to be automatically provisioned to the requesting mobile device 3 once the associated user has been approved by the account management system 7 and/or payment account issuer 10. At step S3-11 the middleware server 16 in the account management system 7 receives the request for application of a new mobile payment account product and in response, transmits application form data for the new product back to the mobile device 3, together with a digital document including pre-application terms and conditions (T&C). It is appreciated that the pre-application terms and conditions may be particular to the product and may set out specific product terms that the user must review and accept before the automated application process for the product can proceed. The digital document can be generated by the middleware server 16 in real-time, and can be a customer specific product disclosure based on user details. In an embodiment, the digital document is generated from a template document, and populated with user-specific details. Accordingly, at step S3-13 the mobile device 3 receives the application form data and the T&C digital document, and may store the T&C digital document in the secure memory 4. The digital document is stored by the mobile device 3 for a predetermined amount of time, such as for 15 business days. At step S3-15, the mobile device 3 displays the T&C digital document to the user. FIG. 4e shows an exemplary wallet display screen 63 displaying the user navigatable T&C digital document, and a user input button 65 that the user can press to indicate acceptance of the pre-application terms and conditions.

In this embodiment, the mobile device 3 is configured to transmit an indication to the middleware server 16 that the user is viewing the T&C digital document, at step S3-17. It is appreciated that this indication is in the form of a data message. Alternatively, the mobile device 3 may be configured to provide a plurality of messages to the middleware server 16 as the user navigates through the digital document to indicate the user's progress through the terms and conditions. The middleware server 16 can be configured to automatically update the tracked progress of the user's application process in response to receipt of the indication that the T&C digital document is being viewed.

At step S3-19, the mobile device 3 receives user input indicating acceptance of the pre-application terms and conditions. In response, the mobile device 3 transmits a further indication to the middleware server 16 that the user has accepted the terms and conditions, at step S3-21. The middleware server 16 is then configured to automatically update the tracked progress of the user's application process in response to receipt of the indication that the user has accepted the pre-application terms and conditions. After the user has input acceptance of the terms and conditions by pressing the user input button 65, the mobile device 3 displays one or more of the "apply for new product" wallet screens 26 to prompt for and receive user input of details to complete the application for the desired mobile payment account product, at step S3-23. After the user has completed the application form displayed via the "apply for new product" wallet screens 26, the mobile device 3 transmits the completed application form data to the middleware server 16 to initiate the new mobile payment account provisioning process. This provisioning process includes approving the user's application, as well as creating, transmitting and securely storing inactive mobile payment account data on the mobile device 3, as discussed in more detail in the above-referenced co-pending U.S. patent application Ser. No. 12/891,866. Accordingly, at step S3-25, the middleware server 16 is arranged to create a new mobile payment account for the user in accordance with the user selected mobile payment account product. In addition, the inactive mobile payment account data 6 is provisioned by the middleware server 16 to the mobile device 3 and stored in the secure memory 4. If the user's application for a new product cannot be automatically approved by the account management system 7 and/or the payment account issuer 10, the user is notified that the decision is pending manual intervention. Once a final decision has been made, notification that the application has been approved or declined is communicated to the user, for example, via a message transmitted to the mobile device 3 or online through a check application status web page.

Figure 4F:
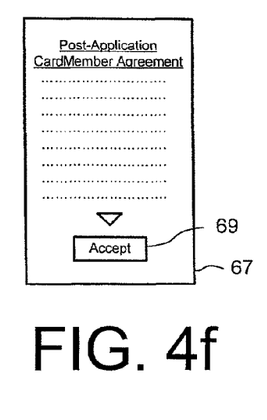

In this embodiment, after the inactive mobile payment account has been provisioned to the mobile device 3 at step S3-25, the middleware server 16 transmits a post-application cardmember agreement (CMA) digital document to the mobile device 3 at step S3-27, including further specific product terms particular to the product that the user must review and accept in order to complete the application process. It is appreciated that the CMA digital document may alternatively be transmitted to the mobile device 3 together with the provisioned mobile payment account data 6. At step S3-29, the mobile device 3 receives the CMA digital document and may store the digital document in the secure memory 4. At step S3-31, the mobile device 3 displays a notification to the user that the application for the selected product has been approved, together with or followed by display of the received CMA digital document. In a similar manner as described above with reference to the T&C digital document, the mobile device 3 is configured to transmit one or more messages to the middleware server 16 as the user is navigating through the CMA digital document via the mobile device 3. FIG. 4f shows an exemplary wallet screen 67 displaying the user navigatable CMA digital document, and a user input button 69 that the user can press to indicate acceptance of the post-application clauses of the agreement.

At step S3-35, the mobile device 3 receives user input indicating acceptance of the CMA, and in response, transmits a message to the middleware server 16 to indicate that the user has accepted the post-application agreement. At step S3-37, the middleware server 16 receives the indication of user acceptance of the CMA and can be configured to automatically update the tracked progress of the user's application process with the indication that the user has accepted the post-application CMA. After the user has input acceptance of the CMA, the mobile device 3 proceeds at step S3-39 to the mobile payment account activation process as described in the above-referenced co-pending U.S. patent application Ser. No. 12/891,866. Once the activation process has been completed, the activated mobile payment account in the electronic wallet of the mobile device 3 can then be used to carry out contactless payment transactions as described in the above referenced co-pending U.S. patent application Ser. Nos. 12/891,866 and 12/905,419.

Figure 5:
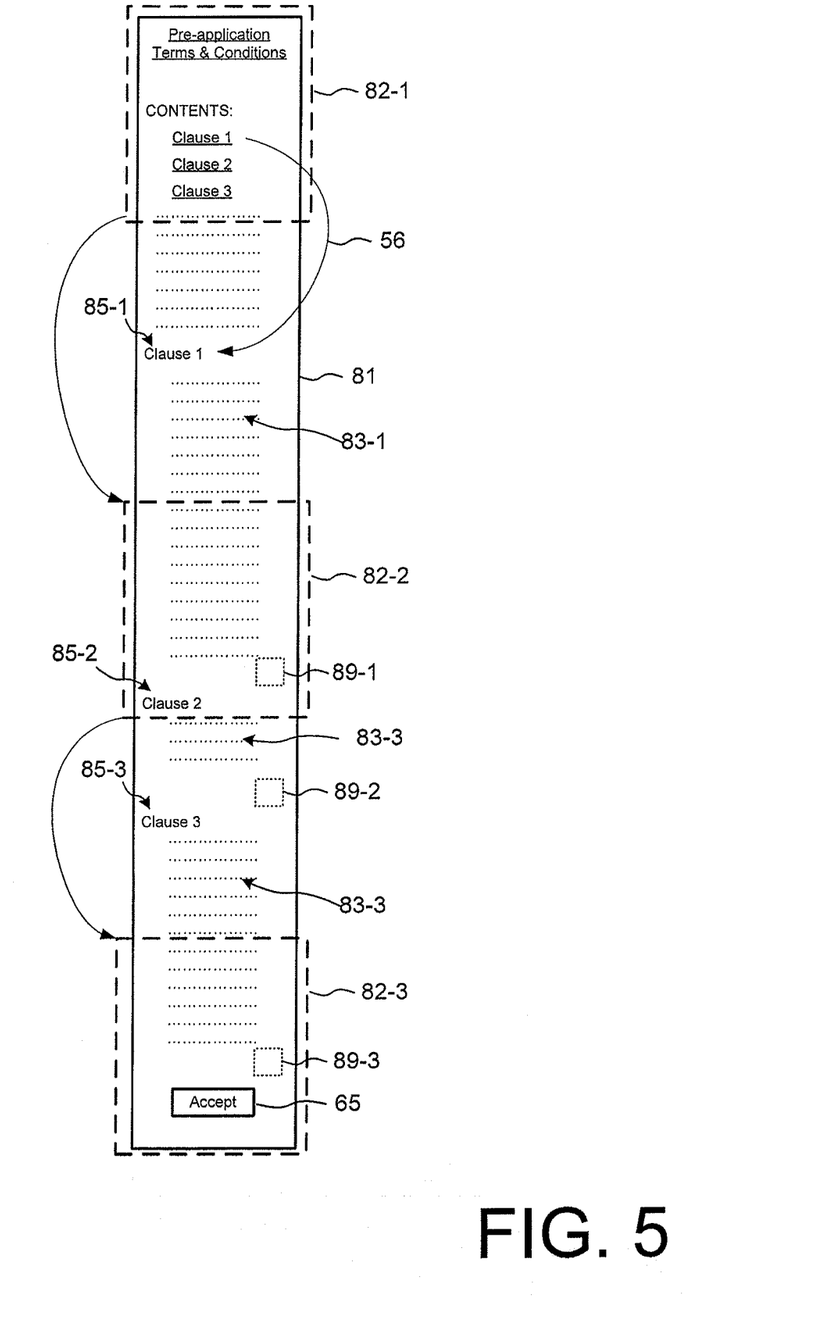
FIG. 5 schematically illustrates a digital document structure for facilitating enhanced monitoring and tracking of user navigation through the document, according to an alternate embodiment of the present invention.

A second embodiment will now be described for facilitating further monitoring and tracking of the mobile payment account product application process. In particular, the second embodiment enables tracking of user navigation through a digital document prior to user input of acceptance. In the embodiment described above, the mobile device 3 receives a digital document from the middleware server 16, for example the T&C or CMA digital document, and waits for user input of acceptance of terms and conditions or of the CMA. It is mentioned above that the mobile device 3 is configured to transmit one or more messages back to the middleware server 16 indicating the user's progress through the digital document. In this embodiment, an enhanced digital document is described with reference to FIG. 5 for facilitating enhanced monitoring and tracking of user navigation through the document. As shown in FIG. 5, a digital document 81 has a hierarchical document structure including a plurality of sections each with a respective heading, with a portion 82-1 of the digital document 81 being viewable at any one time via the display 25 of the mobile device 3. It is appreciated that the amount of the digital document 81 that is viewable at one time depends on the hardware capability of the mobile device 3 such as the display resolution. It will be further appreciated that the digital document 81 can be displayed as a plurality of successive pages of the document, or alternatively can be displayed as a single scrollable document. For example, in the digital document 81 illustrated in FIG. 5, navigation through the digital document 81 may include display of an initial portion 82-1 of the document, typically the start of the document, followed by one or more intermediary portions 82-2, and finally to a portion 82-3 corresponding to the end of the digital document 81 including the user selectable button 65 to confirm acceptance of the clauses in the digital document 81. User navigation throughout the digital document 81 does not need to be performed in a linear manner. As a further alternative, the wallet application module 8 is configured to enable user configuration of the amount of the document to be displayed, for example, via a zoom function.

In the exemplary T&C digital document illustrated in FIG. 5, three sub-sections 83-1, 83-2, 83-3 are shown corresponding to respective clauses indicated by the sub-headings 85-1, 85-2, 85-3. The sub-headings 85 are presented at the beginning of the digital document 81 as a list of user selectable links or bookmarks to the respective position in the digital document. The links effectively provide efficient user navigation to the respective portion of the digital document, as illustrated by the navigation arrow 87. In this embodiment, the digital document 81 includes embedded data for respective locations in the digital document 81, illustrated schematically in FIG. 5 as dashed boxes 89-1, 89-2 and 89-3 located after each section 83-1, 83-2 and 83-3, respectively in the digital document 81. When a particular portion of the digital document 81 associated with such an embedded data item 89 is displayed by the mobile device 3, the embedded data 89 triggers the mobile payment account wallet application module 8 to transmit a message to the middleware server 16 to indicate that the user has viewed that portion of the digital document 81. In this way, the present embodiment advantageously facilitates enhanced monitoring of user navigation throughout a digital document and more detailed tracking of the automated application progress.

Additionally, by providing enhanced monitoring of user navigation throughout a digital document, the account management system 7 and the payment account issuer 10 are able to automatically ascertain with increased confidence that a user has thoroughly viewed the pre-application T&C and the post-application CMA terms and clauses. In a further embodiment, the middleware server 16 can be further configured to determine when one or more portions of a digital document has not been viewed by the user, and to then transmit a message to prompt for confirmation of consent to the respective terms or clauses.

In yet a further embodiment, the mobile device 3 is further configured to track user review of the digital documents including one or more of monitoring of time stamps associated with when the digital document, or each portion of the digital document, is viewed, the areas reviewed and consented, and the location of review for example via Global Positioning System functionality of the mobile device 3.

It will be understood that embodiments of the present invention are described herein by way of example only, and that various changes and modifications may be made without departing from the scope of the invention.

In the embodiments described above, the mobile payment account is provisioned on a mobile handset which communicates with the account management system via a cellular telephone network. Instead of a mobile handset, other portable electronic devices configured for contactless payment with a merchant electronic POS, and having suitable input and display means, carry out the functionality of real time applying for a new mobile payment account product, as described in the above embodiments. Additionally, the portable electronic device is configured to communicate with the account activation system via any other form of communication channel instead of or in addition to the above discussed over the air channels, such as a wired or wireless network connection, a Bluetooth connection, or the like. Alternatively, the mobile payment account data is provisioned on the portable electronic device by data transfer via any suitable data communication path or by way of a computer readable medium.

In the embodiments described above, the application process is carried out automatically via a mobile device. The process of conducting and tracking the application process, and in particular of digital document delivery and monitoring of user navigation through a digital document, is applicable to alternative embodiments and scenarios involving one or more additional devices other than the user's mobile device. In a first exemplary alternative scenario, the process involves integration with the electronic POS terminal, and the digital document may instead or additionally be delivered to the POS to be printed out for presentation to the user. In a second alternative scenario similar to the first scenario, the POS is integrated in the process but comprises a mobile device such as a portable computer or electronic tablet device. It is appreciated that in this scenario, the digital documents are formatted for optimized display and user interaction on the target mobile device. The digital documents are then delivered to the merchant mobile device in this scenario, in a similar manner as described above. In a third alternative scenario, the process is carried out from a merchant store via an Internet or web-based kiosk. It is appreciated that in this scenario, the digital documents are instead formatted for optimized display and user interaction via a web browser executed by the kiosk. In a fourth alternative scenario, the process involves the user's personal computer interacting with the account management system via the Internet and, similar to the third scenario, the digital documents are formatted for optimized display and user interaction via a web browser of the personal computer.

In the embodiments described above, the application process involves delivery of a pre-application T&C digital document and a post-application CMA digital document. Alternatively, a single document is generated and transmitted to the mobile device. The digital document is transmitted to the mobile device at any time prior to the activation process, or is pre-loaded onto the mobile device prior to supply to the user, whereby the inactive provisioned mobile payment account can only be activated once the user has viewed and accepted the terms, conditions and/or agreement clauses.

In the embodiments described above, the mobile device stores a plurality of application modules (also referred to as computer programs or software) in memory, which when executed enable the mobile device to implement embodiments of the present invention as discussed herein. The software is stored in a computer program product and loaded into the mobile device using any known instrument, such as removable storage disk or drive, hard disk drive, or communication interface, to provide some examples.

In the embodiments described above, the account management system is described as a separate entity to the payment account issuer and the associated payment processing system. It is appreciated that the account management system can be provided as an integral part or sub-system of the payment account issuer and/or payment processing system.

Alternative embodiments may be envisaged, which nevertheless fall within the spirit and scope of the following claims.

What is claimed is:

1. A computer-implemented method of tracking a process of provisioning, by a server to a portable device in a mobile payment system, payment account data for authorizing a payment transaction, the method comprising:
    selecting, by the user on the portable device, an inactive payment account product from a plurality of payment account product options;
    receiving, from the portable device upon which a mobile payment account wallet application module is launched, a user request for the inactive payment account product allowing for communication with a merchant point of sale terminal to carry out a payment transaction;
    responsive to the user request, initiating a provisioning process for the inactive payment account product requested by the user request, including storing status data indicative of an initiated state of the provisioning process;
    transmitting, to the portable device, a first digital document including information that must be viewed and accepted by a user before the server provisions the payment account data for the requested inactive payment account product, and updating the status data indicative of a transmitted state of the digital document;
    receiving, from the portable device, an indication that the first digital document has been viewed and accepted by the user;
    prompting for and receiving at the server user input of details associated with the inactive payment account product;
    provisioning, to the portable device, in response to receiving an indication that the first digital document has been viewed and accepted and prompting for and receiving input details, payment account data for the inactive payment account product as requested;
    transmitting, to the portable device, a second digital document that must be viewed and accepted by the user, and updating the status data indicative of a transmitted state of the second digital document; and
    receiving, from the portable device, an indication that the second digital document has been viewed and accepted by the user, and activating the inactive payment account product to allow for communication with a merchant point of sale terminal to carry out a payment transaction.

2. The method of claim 1, wherein the plurality of payment account product options is determined based on user details or search criteria.

3. The method of claim 1, wherein the digital document includes pre-application terms and conditions that the user must view and accepted before the middleware server provisions the payment account data for the inactive payment account product.

4. The method of claim 3, wherein the second digital document includes post-application agreement information specific to the inactive payment account product that must be viewed and accepted by the user.

5. The method of claim 4, further comprising receiving, from the portable device, an indication to the server that the user has viewed the second digital document, and updating, by the server responsive to receipt of the indication, the status data indicative of a viewed state of the second digital document.

6. The method of claim 1, wherein the digital document comprising data associated with one or more portions of the digital document for triggering transmission of an indication that a particular portion of the digital document has been viewed.

7. The method of claim 1, further comprising tracking a time of viewing one or more portions of the digital document.

8. The method of claim 1, further comprising tracking a location of viewing one or more portions of the digital document.

9. The method of claim 1, wherein the digital document is formatted for the portable device.

10. The method of claim 1, wherein the portable device is a mobile handset.

11. The method of claim 1, wherein the portable device is for contactless payment transactions.

12. A mobile payment account system comprising a portable device in communication with a middleware server, wherein the middleware server is operable to:
    receive a user request for a selected inactive payment account product from the portable device upon which a mobile payment account wallet application module is launched, the user request being the selected inactive payment account product as selected from a plurality of payment account product options wherein the selected inactive payment account product allows for communication with a merchant point of sale terminal to carry out a payment transaction;
    initiates, responsive to the user request as received, a provisioning process for the selected inactive payment account product requested by the user request, the provisioning process including storing status data indicative of an initiated state of the provisioning process;
    transmit, to the portable device, a first digital document including information that must be viewed and accepted by a user before the server provisions the payment account data for the selected inactive payment account product, and updates the status data indicative of a digital document transmitted state;
    receive, from the portable device, an indication that the first digital document has been viewed and accepted by the user and in response, update the status data indicative of a digital document viewed and accepted state;
    prompting for and receiving at the middleware server user input of details associated with the selected inactive payment account product;
    provision, to the portable device, in response to receiving an indication that the first digital document has been viewed and accepted and prompting for and receiving input details, payment account data for the selected inactive payment account product as requested;

transmit, to the portable device, a second digital document including information specific to the selected inactive payment account product that must be viewed and accepted by the user, and update the status data indicative of the transmitted state of the second digital document; and receive, from the portable device, an indication that the second digital document has been viewed and accepted by the user, and in response, activate the selected inactive payment account product to allow for communication with a merchant point of sale terminal to carry out a payment transaction.

13. A non-transitory computer-readable medium comprising computer-executable instructions, that when executed perform a method of tracking a process of provisioning, by a server to a portable device in a mobile payment system, payment account data for authorizing a payment transaction, when executed by respective components of a payment system, comprising:

computer-implementable instructions for receiving, from the portable device, a user request for a selected inactive payment account product upon which a mobile payment account wallet application module is launched, the user request being the selected inactive payment account product as selected from a plurality of payment account product options wherein the selected inactive payment account product allows for communication with a merchant point of sale terminal to carry out a payment transaction;

computer-implementable instructions for initiating, responsive to the user request, a provisioning process for the selected inactive payment account product, including storing status data indicative of an initiated state of the provisioning process;

computer-implementable instructions for transmitting, to the portable device, a first digital document including information to be viewed and accepted by a user before the server provisions the payment account data for the selected inactive payment account product;

computer-implementable instructions for receiving, from the portable device, an indication that the first digital document has been viewed and accepted by the user;

prompting for and receiving user input of details associated with the selected inactive payment account product;

computer-implementable instructions for provisioning, to the portable device, in response to receiving an indication that the first digital document has been viewed and accepted and prompting for and receiving input details, payment account data for the selected inactive payment account product as requested;

computer-implementable instructions for transmitting, to the portable device, a second digital document including information specific to the selected inactive payment account product that must be viewed and accepted by the user; and computer-implementable instructions for receiving, from the portable device, an indication that the second digital document has been viewed and accepted by the user, and in response, activating the selected inactive payment account product to allow for communication with a merchant point of sale terminal to carry out a payment transaction.

\* \* \* \* \*